United States Patent
Han et al.

(10) Patent No.: US 12,068,687 B2
(45) Date of Patent: Aug. 20, 2024

(54) METHOD TO REDUCE OVERSHOOT IN A VOLTAGE REGULATING POWER SUPPLY

(71) Applicant: Advanced Micro Devices, Inc., Santa Clara, CA (US)

(72) Inventors: Wei Han, Shanghai (CN); Lili Chen, Shanghai (CN)

(73) Assignee: Advanced Micro Devices, Inc., Santa Clara, CA (US)

( * ) Notice: Subject to any disclaimer, the term of this patent is extended or adjusted under 35 U.S.C. 154(b) by 96 days.

(21) Appl. No.: 17/502,272

(22) Filed: Oct. 15, 2021

(65) Prior Publication Data
US 2023/0124434 A1    Apr. 20, 2023

(51) Int. Cl.
*H02M 3/158*   (2006.01)
*H02M 1/00*    (2006.01)
*H02M 1/08*    (2006.01)

(52) U.S. Cl.
CPC ......... *H02M 3/158* (2013.01); *H02M 1/0029* (2021.05); *H02M 1/08* (2013.01)

(58) Field of Classification Search
CPC ......... H02M 3/155–156; H02M 3/145; H02M 3/158; H02M 3/1582–1588; H02M 2001/4283; H02M 2001/4291; H02M 2003/1552; H02M 1/12; H02M 1/42; H02M 1/4225; H02M 1/4233; H02M 1/4241; H02M 1/4258; H02M 1/425; H02M 1/4208; G05F 1/70; H02J 3/16
See application file for complete search history.

(56) References Cited

U.S. PATENT DOCUMENTS

| | | |
|---|---|---|
| 7,091,709 B2 | 8/2006 | Suzuki |
| 7,199,565 B1 | 4/2007 | Demolli |
| 7,999,523 B1 | 8/2011 | Caffee et al. |
| 8,947,112 B2 | 2/2015 | Yamonobe |
| 9,261,892 B2 | 2/2016 | Wang et al. |
| 9,337,824 B2 | 5/2016 | Piselli et al. |
| 9,537,581 B2 | 1/2017 | Mills et al. |
| 9,625,925 B2 | 4/2017 | Yan et al. |
| 9,817,426 B2 | 11/2017 | Chellappa |
| 10,281,943 B1 | 5/2019 | Ho |
| 10,296,026 B2 | 5/2019 | Caffee et al. |

(Continued)

FOREIGN PATENT DOCUMENTS

WO    2020086150 A2    4/2020

OTHER PUBLICATIONS

Lee, J., "Basic Calculation of a Buck Converter's Power Stage," Richtek Application Note AN041—Dec. 2015, 9 pages.

(Continued)

*Primary Examiner* — Bryan R Perez
(74) *Attorney, Agent, or Firm* — Zagorin Cave LLP

(57) ABSTRACT

A method for operating a system including a voltage regulating power supply includes sensing a local voltage on a first node of the system and a remote voltage on a second node of the system. The first node and the second node are in a conductive path coupled to a load of the system. The first node is closer to a power stage of the voltage regulating power supply than the second node. The second node is closer to the load than the first node. The method includes detecting a load release event based on the local voltage, the remote voltage, and at least one predetermined threshold value.

21 Claims, 4 Drawing Sheets

(56) References Cited

U.S. PATENT DOCUMENTS

| | | |
|---|---|---|
| 10,784,860 B1 | 9/2020 | Sakai |
| 11,556,144 B2 | 1/2023 | Onody et al. |
| 11,561,563 B2 | 1/2023 | Zsolczai et al. |
| 2005/0248331 A1 | 11/2005 | Whittaker |
| 2007/0241731 A1 | 10/2007 | van Ettinger |
| 2008/0054867 A1 | 3/2008 | Soude et al. |
| 2008/0238385 A1 | 10/2008 | Nagata |
| 2008/0303496 A1 | 12/2008 | Schleuter et al. |
| 2009/0295360 A1 | 12/2009 | Hellums |
| 2010/0117699 A1 | 5/2010 | Wu |
| 2010/0156362 A1 | 6/2010 | Xie |
| 2010/0156364 A1 | 6/2010 | Cho et al. |
| 2011/0121802 A1 | 5/2011 | Zhu |
| 2013/0082671 A1 | 4/2013 | Ivanov et al. |
| 2013/0229160 A1* | 9/2013 | Saito ............... H02M 3/156 323/282 |
| 2014/0028187 A1* | 1/2014 | Kambara ........... H02M 3/005 363/21.17 |
| 2015/0185747 A1 | 7/2015 | Liu |
| 2015/0198960 A1 | 7/2015 | Zhang et al. |
| 2015/0286232 A1 | 10/2015 | Parikh |
| 2016/0224040 A1 | 8/2016 | Peluso et al. |
| 2016/0357206 A1 | 12/2016 | Liu |
| 2017/0093399 A1 | 3/2017 | Atkinson et al. |
| 2017/0115677 A1 | 4/2017 | Caffee |
| 2017/0126329 A1 | 5/2017 | Gorecki |
| 2017/0160757 A1 | 6/2017 | Yang |
| 2017/0244395 A1 | 8/2017 | Ojha |
| 2018/0017984 A1 | 1/2018 | Mayer et al. |
| 2018/0053463 A1 | 2/2018 | Kong et al. |
| 2018/0129234 A1 | 5/2018 | Melgar et al. |
| 2018/0173258 A1 | 6/2018 | Singh |
| 2019/0109529 A1 | 4/2019 | Nobe et al. |
| 2022/0278612 A1* | 9/2022 | Hirose ............... H02M 1/0009 |
| 2022/0385169 A1* | 12/2022 | Ghorband ........... H02M 3/158 |
| 2023/0079601 A1* | 3/2023 | Bafna ............... H02M 1/0025 323/271 |

OTHER PUBLICATIONS

Klomark, S., "Design of an Integrated Voltage Regulator," Institution for Systemteknik, Oct. 17, 2003, 54 pages.

ON Semiconductor, "Single 6 A High-Speed, Low-Side SiC MOSFET Driver," Semiconductor Components Industries, LLC, 2017, Rev. 3, Apr. 2019, Publication Order No. NCP51705/D, 21 pages.

ON Semiconductor, "Single 6 A High-Speed, Low-Side SiC MOSFET Driver NCP51705," Semiconductor Components Industries, LLC 2017, Rev. 4, Nov. 2021, Publication Order No. NCP51705/D, 22 pages.

ROHM Semiconductor, "Isolation Voltage 2500Vrms I ch Gate Driver Providing Galvanic Isolation," Gate Driver Providing Galvanic Isolation Series, BM60054AFV-C Datasheet, Rev. 003, Apr. 23, 2018, 42 pages.

* cited by examiner

METHOD TO REDUCE OVERSHOOT IN A VOLTAGE REGULATING POWER SUPPLY

BACKGROUND

Description of the Related Art

FIGS. 1 and 2 illustrate a conventional voltage regulating power supply (e.g., a step-down converter or buck converter) and its operation. Voltage regulating power supply 100 has two states of operation: an on-state (e.g., switch 102 is closed according to a control signal) and an off-state (e.g., switch 102 is open according to the control signal). During the on-state, since voltage source $V_{IN}$ is serially coupled to inductor 104 and load 108, a current through inductor 104 increases and a voltage is induced across the inductor. Voltage $V_L$ counteracts (i.e., opposes) the voltage of voltage source $V_{IN}$ and reduces voltage $V_{OUT}$ across the load. Meanwhile, inductor 104 absorbs energy from voltage source $V_{IN}$ and stores the energy in the form of a magnetic field and capacitor 106 stores charge.

If the control signal opens switch 102, voltage regulating power supply 100 enters the off state. In the off state, switch 102 disconnects voltage source $V_{IN}$ from the remainder of the circuit. Diode 110 causes the current through the inductor to continue to flow, but at a lower magnitude. As a result, the voltage induced across the inductor changes direction. Since energy is stored in the inductor, the inductor becomes a voltage source that supplies the load by releasing stored energy and capacitor 106 supplies power to the load. By constantly switching between the on-state and the off-state, the voltage regulating power supply decreases the voltage from the input to the output. If the voltage regulating power supply operates in steady state, during a cycle, the current through the inductor at the beginning of the on-state will be the same as the current at the end of the off state and the accumulated current change during one operation cycle (i.e., one period of the on-state and the off-state) is zero. In general, voltage $V_{OUT}$ can be controlled by controlling the switching duty cycle D ($V_{OUT}/V_{IN}$=D).

Referring to FIG. 3, in practice, a sudden change in the load may cause the control loop and may cause voltage overshoot or voltage undershoot. Spikes in the supply voltage can cause a target system to shut down if the voltage exceeds a predetermined voltage specification. Undershoot may be caused by a sudden increase of load current (e.g., when a processor in the load has a working status change and enters a higher power, higher processing mode from an idle mode). Overshoot may be caused by a sudden decrease in load current (i.e., a load release event, e.g., when a processor in the load has a working status change and enters an idle mode from a higher power, higher processing mode). Typical voltage regulators turn off a pulse width modulator that generates the switch control signal in response to the load current falling below a predetermined threshold and increase capacitance of capacitor 106 to absorb the energy. However, comparison of the load current to a predetermined threshold and opening the switch may not respond quickly enough to sufficiently reduce or eliminate the overshoot and additional capacitors are needed to absorb the excess energy. The additional capacitors require area on the printed circuit board and increase the cost of a target system. Accordingly, improved techniques for reducing overshoot in a switched mode power supply are desired.

SUMMARY OF EMBODIMENTS OF THE INVENTION

In at least one embodiment, a method for operating a system including a voltage regulating power supply includes sensing a local voltage on a first node of the system and a remote voltage on a second node of the system. The first node and the second node are in a conductive path coupled to a load of the system. The first node is closer to a power stage of the voltage regulating power supply than the second node. The second node is closer to the load than the first node. The method includes detecting a load release event based on the local voltage, the remote voltage, and at least one predetermined threshold value.

In at least one embodiment, a system includes a power stage of a voltage regulating power supply. The power stage is coupled between an input power supply node of the voltage regulating power supply and a second power supply node of the voltage regulating power supply. The power stage is responsive to a pulse-width modulated signal. The system includes an energy absorbing element coupled between an output of the power stage and the second power supply node. The system includes a circuit coupled to the output of the power stage and the second power supply node. The system includes a first node of the system and a second node of the system. The first node and the second node are in a conductive path coupled to a load. The first node is closer to the power stage than the second node. The second node is closer to the load than the first node. The system includes a processing circuit configured to sense a local voltage on the first node and a remote voltage on the second node and to detect a load release event based on the local voltage and the remote voltage.

In at least one embodiment, a processing system includes a processor coupled to an output voltage node. The processing system includes a voltage regulating power supply. The voltage regulating power supply includes a power stage coupled between an input power supply node and a second power supply node. The power stage is responsive to a pulse-width modulated signal. The voltage regulating power supply includes an energy absorbing element coupled between an output of the power stage and the second power supply node. The voltage regulating power supply includes a circuit coupled to the output of the power stage and the second power supply node. The voltage regulating power supply includes a first node of the processing system and a second node of the processing system. The first node and the second node are in a conductive path coupled to a load. The first node is closer to the power stage than the second node. The second node is closer to the load than the first node. The voltage regulating power supply includes a processing circuit configured to sense a local voltage on the first node and a remote voltage on the second node and to detect a load release event based on the local voltage and the remote voltage.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
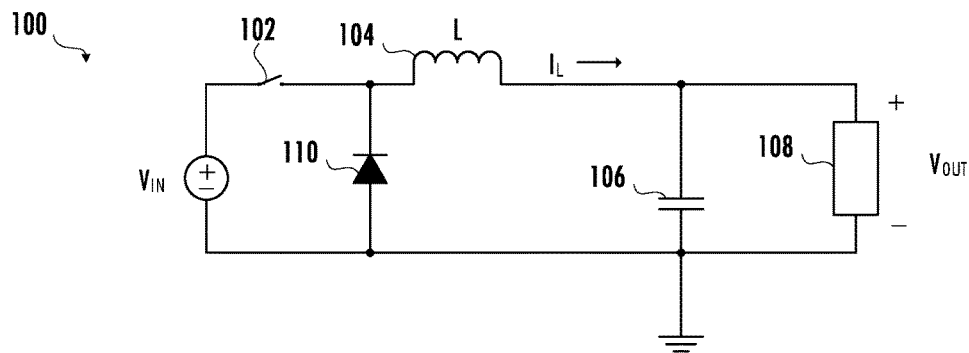
FIG. 1 illustrates a circuit diagram of a conventional voltage regulating power supply.
Figure 2:
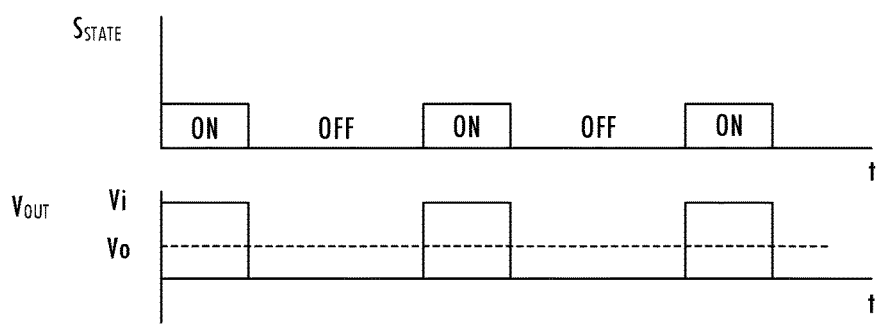
FIG. 2 illustrates signal waveforms for the conventional voltage regulating power supply of FIG. 1.
Figure 3:
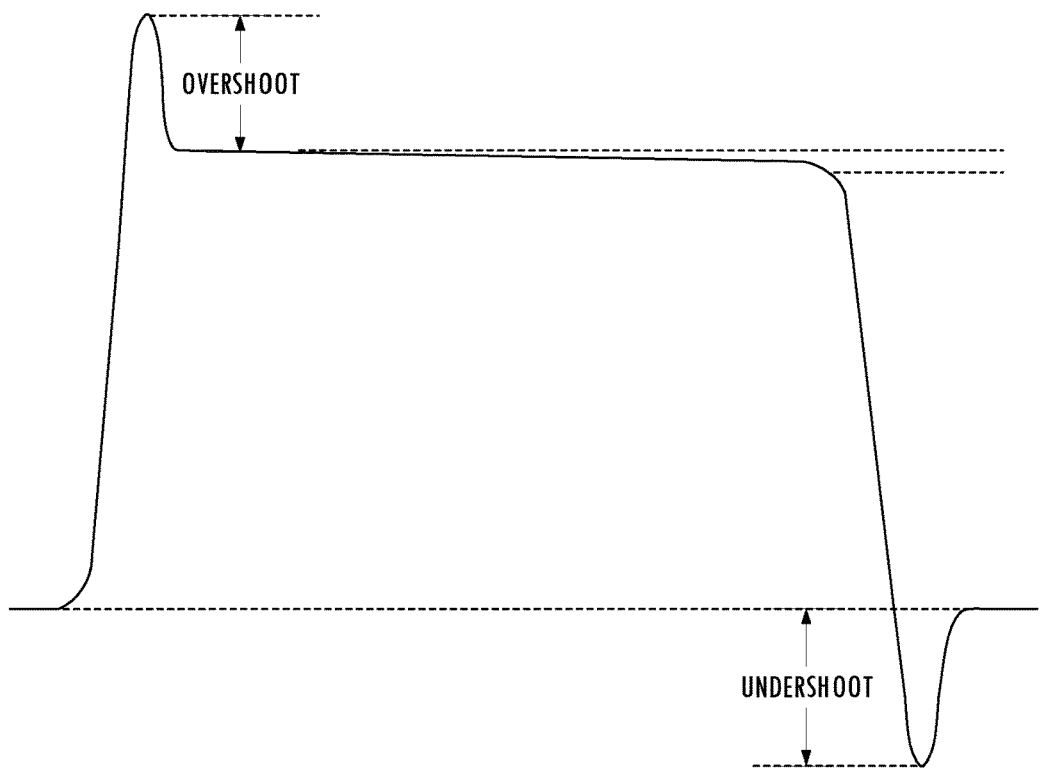
FIG. 3 illustrates a detailed signal waveform for the conventional voltage regulating power supply of FIG. 1.
Figure 4:
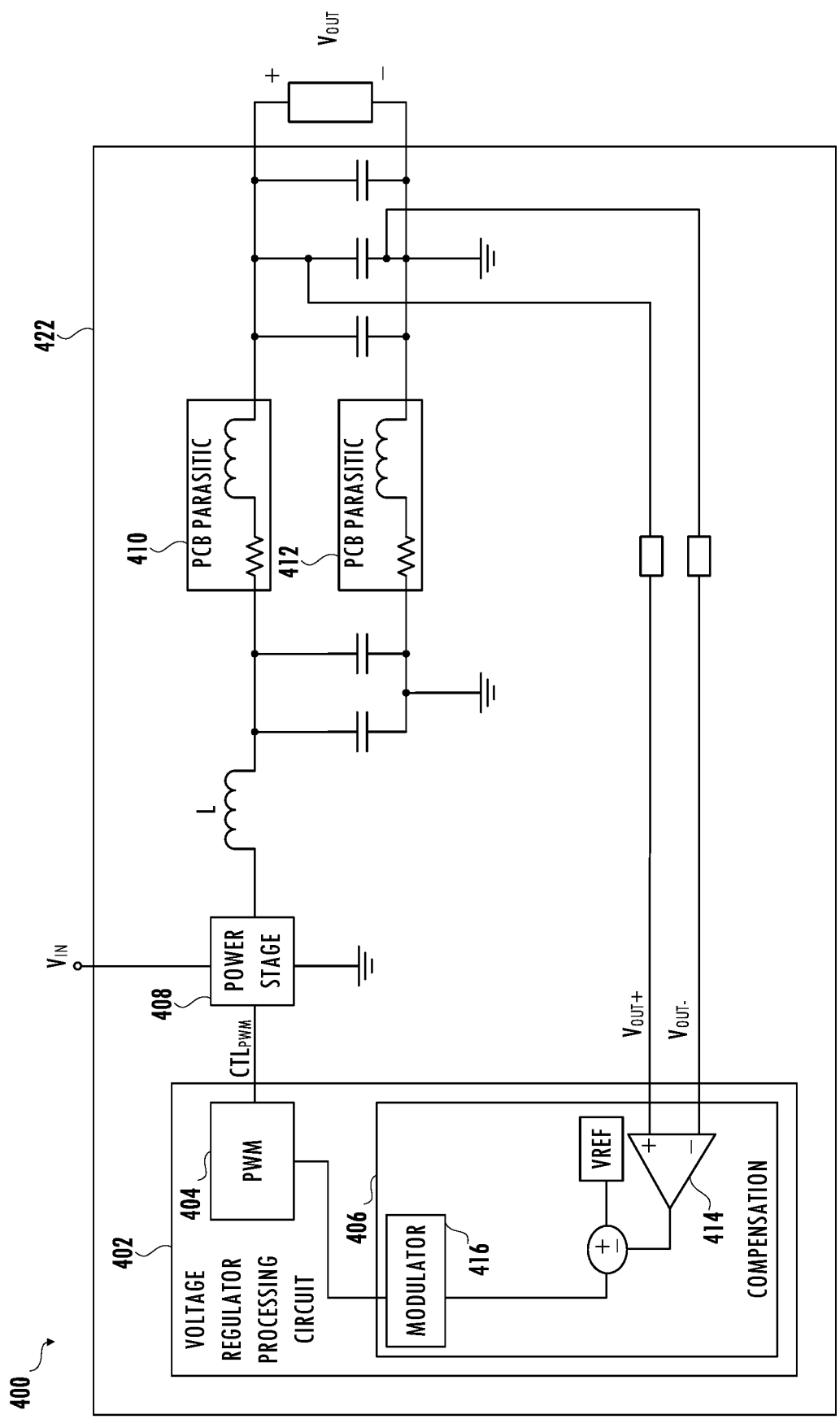
FIG. 4 illustrates a circuit diagram of an embodiment of a voltage regulating power supply.

Referring to FIG. 4, voltage regulating power supply 422 includes voltage regulator controller 402 that generates at least one pulse-width modulated signal $CTL_{PWM}$ for controlling one or more switches in power stage 408. In at least one embodiment, pulse-width modulator 404 adjusts the duty cycle of pulse-width modulated signal $CTL_{PWM}$ according to information received from compensation circuit 406. Compensation circuit 406 senses the current provided to the load using feedback signals $V_{OUT+}$ and $V_{OUT-}$, and amplifier 414 generates a corresponding voltage signal indicative of the comparison. Voltage regulator controller 402 compares that voltage signal to predetermined reference voltage $V_{REF}$. For example, that voltage signal is subtracted from predetermined reference voltage $V_{REF}$. The difference between the indicator and the predetermined reference voltage $V_{REF}$ is modulated by modulator 416 and provided to pulse-width modulator control circuit 404. Pulse-width modulator control circuit 404 uses that signal to adjust the duty cycle of pulse-width modulated signal $CTL_{PWM}$ (e.g., to turn off pulse-width modulated signal $CTL_{PWM}$) provided to power stage 408.

In at least one embodiment, pulse-width modulator 404 increases the duty cycle of pulse-width modulated signal $CTL_{PWM}$ in response to the sensed voltage being less than the predetermined reference voltage $V_{REF}$ and decreases the duty cycle of the control signal in response to the sensed voltage exceeding the predetermined reference voltage $V_{REF}$. The predetermined reference voltage $V_{REF}$ has a value selected to provide a load system with output voltage $V_{OUT}$ that satisfies the voltage specification of a target application. In at least one embodiment, predetermined reference voltage $V_{REF}$ is provided to an integrated circuit for use in regulating the output voltage provided by the voltage regulating power supply to a load system.

In general, compensation circuit 406 senses the output voltage and compares the sensed output voltage to a predetermined threshold value to determine whether to increase or decrease the duty cycle of pulse-width modulated signal $CTL_{PWM}$ to maintain a stable output voltage. However, this topology has bandwidth limitations and is not fast enough to sufficiently reduce or eliminate the overshoot. Accordingly, additional capacitors are added to the system to absorb the excess energy. Those additional capacitors occupy area on the printed circuit board and increase the cost of a target system. In addition, compensation circuit 406 does not distinguish whether the voltage change is the result of the dynamic voltage change event triggered by the load or a load release event.

A technique reduces overshoot in the output voltage provided by a voltage regulating power supply (e.g., a buck converter). The voltage regulating power supply estimates printed circuit board impedance between an output of the voltage regulating power supply and a load by sensing a local voltage proximate to the output and a remote voltage proximate to the load. The local voltage is sensed on a local node closer to the output than a remote node corresponding to the remote voltage and the remote node is closer to the load than the local node. Parasitic impedance (e.g., printed circuit board parasitic impedance 410 and printed circuit board parasitic impedance 412) is coupled between the local node and the remote node due to routing on a printed circuit board required by mechanical specifications (e.g., minimum spacing between a processor and a voltage regulating power supply). The voltage regulating power supply uses the estimated impedance of the printed circuit board to generate a control signal that selectively enables a resistance that absorbs energy in response to a load release event, thereby reducing overshoot in output voltage of the voltage regulating power supply without needing additional capacitance to sink excess charge. In an embodiment, the resistance is coupled in parallel to a diode or transistor in a power stage of the voltage regulating power supply.

Figure 5:
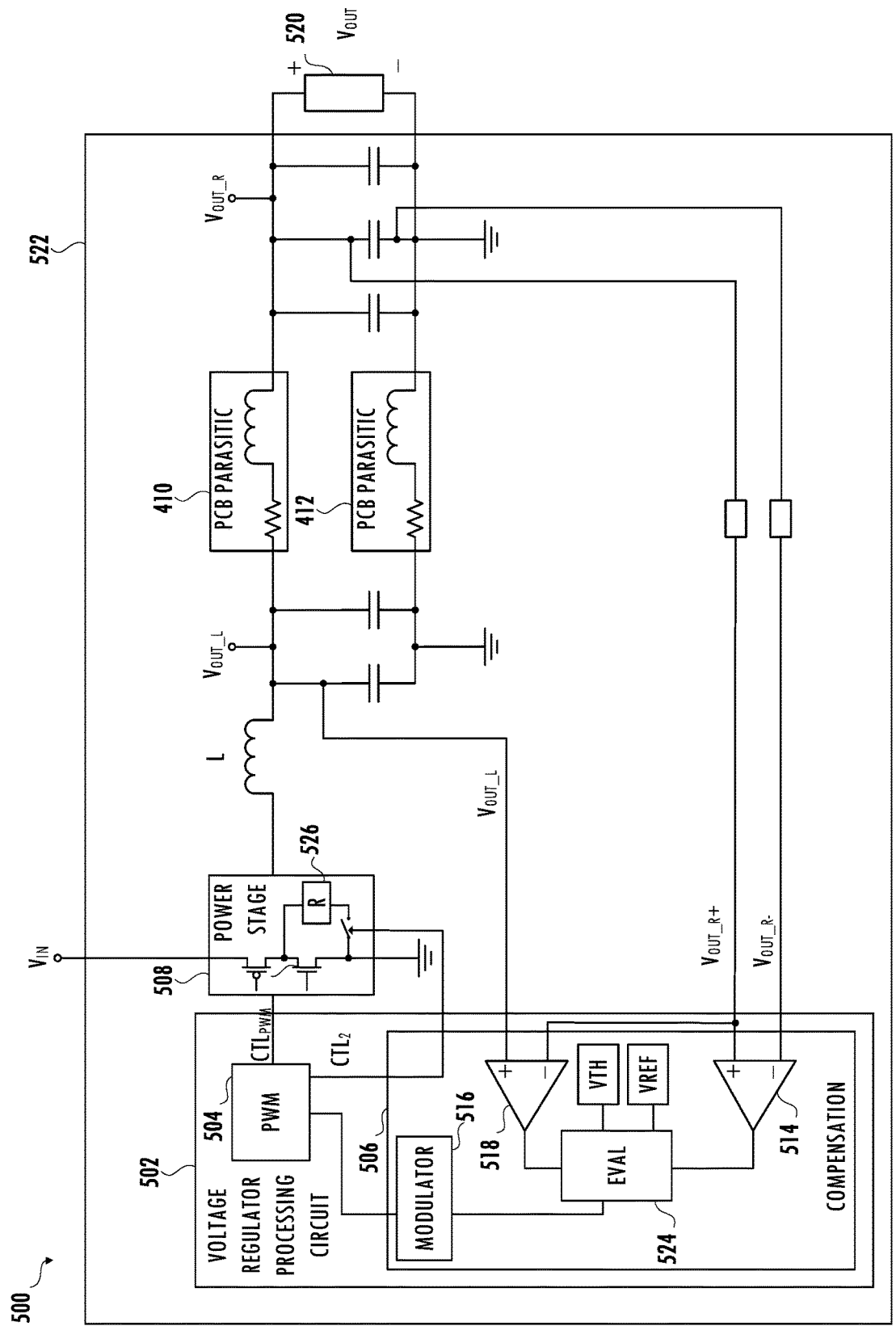
FIG. 5 illustrates a circuit diagram of a voltage regulating power supply consistent with at least one embodiment of the invention.
Figure 6:
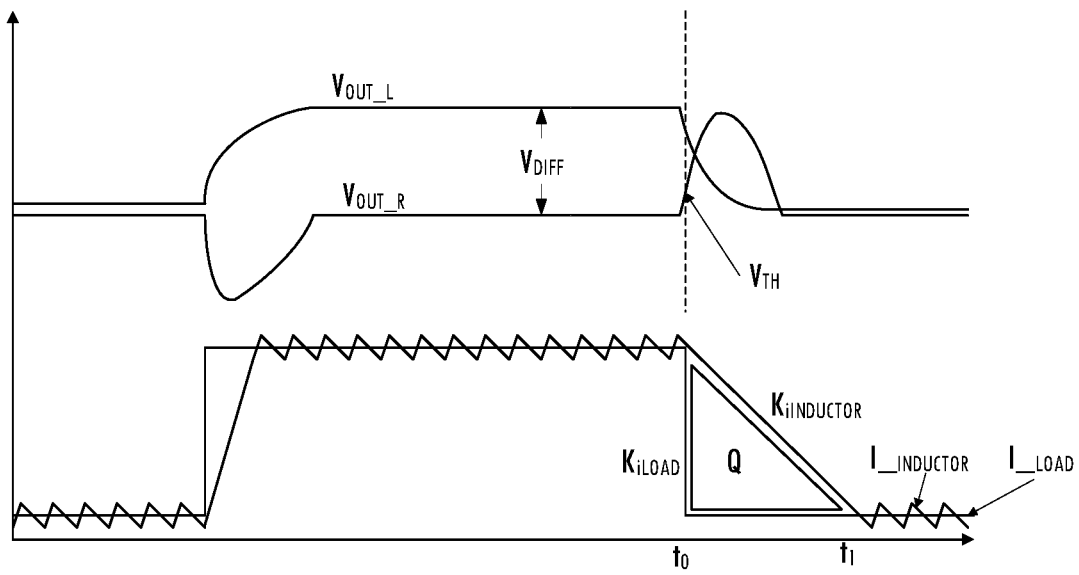
FIG. 6 illustrates a detailed signal waveform for the voltage regulating power supply of FIG. 5.

Referring to FIGS. 5 and 6, voltage regulating power supply 522 includes voltage regulator controller 502 that generates at least one pulse-width modulated signal $CTL_{PWM}$ for power stage 508. Voltage regulator controller 502 distinguishes between a load release event and a dynamic voltage change event (e.g., due to transition of a processor from a high-power state to an idle state when exiting a gaming program). The amount of voltage overshoot $V_{OUT\_OVERSHOOT}$ over interval t is related to output capacitance $C_{OUT}$ of the voltage regulating power supply, slew rate $K_{i_{load}}$ of load current $i_{load}$, slew rate $K_{i_{ind}}$ of inductor current $i_{ind}$, and printed circuit board impedance $R_{PCB}$ over interval t. Since the overshoot voltage is related to the difference in the slew rate of the inductor current and since the slew rate of the load current and the slew rate of the inductor current are related to the parasitic printed circuit board impedance $R_{PCB}$, estimating the parasitic printed circuit board impedance $R_{PCB}$ by sensing a voltage difference across the remote node and the local node is used to detect a load release event (e.g., a change in inductor current accompanied by a substantial change in load current) as distinguished from a dynamic voltage change event (e.g., a change in inductor current accompanied by a nominal change in load current). Note that if the voltage change is caused by a dynamic voltage change event and not a load release event, then the difference of local voltage $V_{OUT\_L}$ and remote voltage $V_{OUT\_R}$ will not change dynamically. That is, difference voltage $V_{DIFF}$, which is equal to $I_{LOAD} \times R_{PCB}$ will be constant since parasitic printed circuit board impedance $R_{PCB}$ and the load current are constant.

In at least one embodiment of voltage regulating power supply 522, power stage 508 includes switched circuit 526, which includes a resistive path that is selectively enabled using control signal $CTL_2$ generated by voltage regulator controller 502. Since the voltage change to a new level may be caused by a load release event (e.g., when a processor enters an idle mode from a higher power mode) or in response to a dynamic voltage change event (e.g., when software in the load processor changes a power state of the processor) that does not need to absorb as much excess energy, compensation circuit 506 detects the load release event as distinguished from a dynamic voltage change event. In at least one embodiment, voltage regulating power supply 522 detects the load release event as distinguished from a dynamic voltage change event and enables switched circuit 526 to absorb excess energy to reduce or eliminate the overshoot voltage at the output capacitors in response to the load release event.

Figure 7:
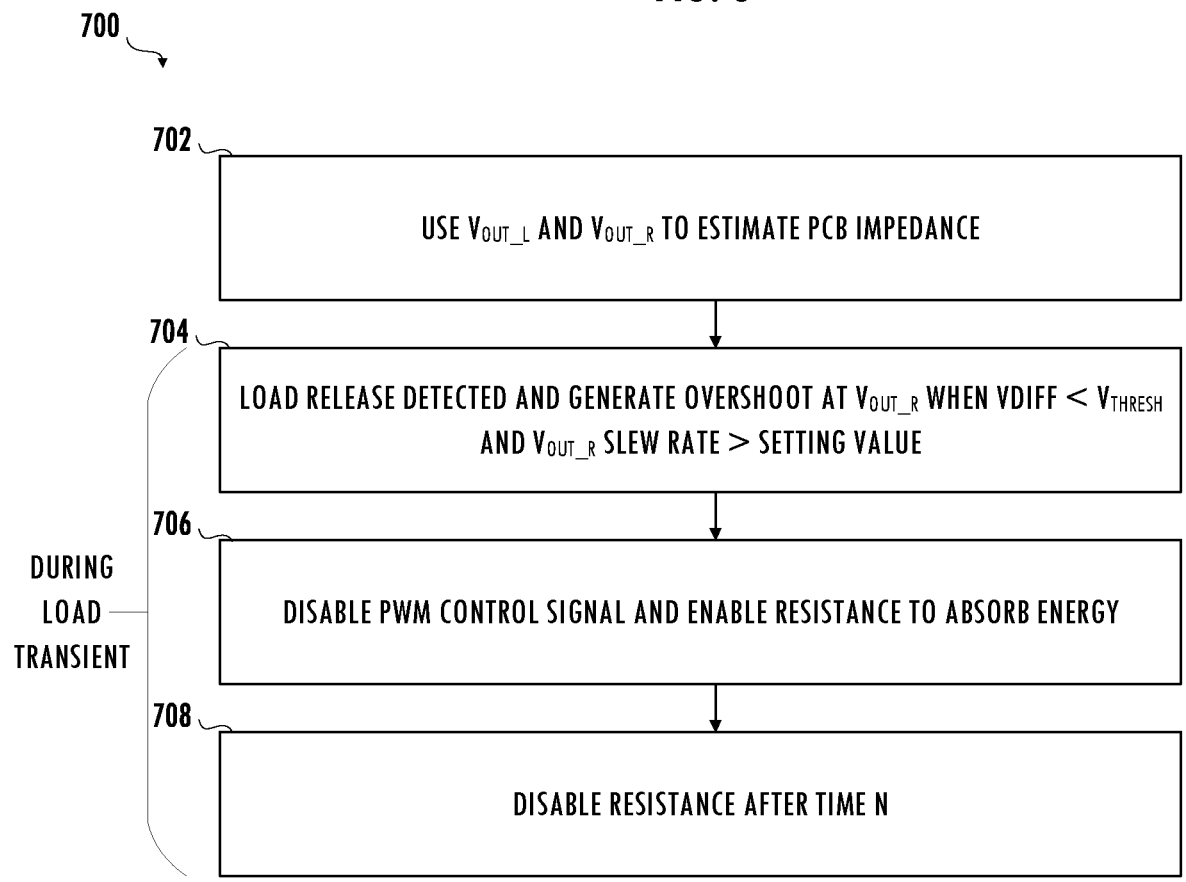
FIG. 7 illustrates an information and control flow for operating the voltage regulating power supply of FIG. 5 consistent with at least one embodiment of the invention.

Referring to FIGS. 5 and 7, in at least one embodiment of voltage regulating power supply 522, voltage regulator controller 502 estimates parasitic printed circuit board impedance $R_{PCB}$ between the power stage and the output node (702). For example, voltage regulator controller 502 senses local voltage $V_{OUT\_L}$ and remote voltage $V_{OUT\_R+}$ and remote voltage $V_{OUT\_R-}$. Voltage regulator controller 502 uses remote voltage $V_{OUT\_R+}$ and remote voltage $V_{OUT\_R-}$ to determine when the slew rate of remote voltage $V_{OUT\_R}$ exceeds a predetermined voltage. For example, difference amplifier 514 compares remote voltage $V_{OUT\_R+}$ to remote voltage $V_{OUT\_R-}$ and provides an indication thereof to evaluation circuit 524. In addition, voltage regulator controller 502 uses remote voltage $V_{OUT\_R+}$, remote voltage $V_{OUT\_R-}$, and local voltage $V_{OUT\_L}$ to determine when difference voltage $V_{DIFF}$ ($V_{DIFF} = V_{OUT\_L} - V_{OUT\_R+} = R_{PCB} \times I_{LOAD}$) falls below a predetermined threshold voltage (i.e., estimated parasitic printed circuit board impedance $R_{PCB}$ falls below a predetermined value) to determine whether a load release event occurred. For example, difference amplifier 518 compares local voltage $V_{OUT\_L}$ to remote voltage $V_{OUT\_R+}$ and provides an indication of the difference (e.g., difference voltage $V_{DIFF}$) to evaluation circuit 524.

Evaluation circuit 524 compares difference voltage $V_{DIFF}$ to predetermined threshold voltage $V_{TH}$. When difference voltage $V_{DIFF}$ is less than predetermined threshold voltage $V_{TH}$ and the slew rate of $V_{OUT\_R}$ is greater than a predetermined reference voltage, then voltage regulator controller 502 detects a load release event and generation of overshoot at remote output node $V_{OUT\_R}$ (704). Evaluation circuit 524 provides an indicator to pulse-width modulator 504 via modulator 516. Pulse-width modulator 504 disables one or more pulse-width modulated control signals $CTL_{PWM}$ that are provided to power stage 508 and enables control signal $CTL_2$ to cause switched circuit 526 to absorb excess energy (706). The current flowing through the inductor flows to load 520 and the output capacitors discharge to load 520 and into the power stage (e.g., into a diode or a source of a low-side transistor). Switched circuit 526 absorbs excess energy, thereby reducing or eliminating voltage overshoot at load 520 during the load release event. After a predetermined time (e.g., after N cycles of a clock signal used by pulse-width modulator 504) during which pulse-width modulated control signal $CTL_{PWM}$ is disabled (e.g., a pulse-width modulated control signal provided to a high-side transistor in the power stage is set to a level that disables the high-side transistor) and switched circuit 526 is enabled, pulse-width modulator 504 disables switched circuit 526 and enables one or more pulse-width modulated control signals $CTL_{PWM}$ (708).

A slowly changing voltage $V_{DIFF}$ indicates that no high load release event occurred. As a result, even if the slew rate of $V_{OUT\_R}$ is greater than the predetermined reference value $V_{REF}$, voltage regulator controller 502 still detects a dynamic voltage change event. Evaluation circuit 524 provides an indictor to pulse-width modulator 504, which disables one or more pulse-width modulated control signals $CTL_{PWM}$ that are provided to power stage 508. During the dynamic voltage change event, switched circuit 526 remains disabled.

Thus, a technique for sensing overshoot of a voltage regulating power supply that absorbs excess energy in response to a load release event without increasing output capacitance has been disclosed. The description of the invention set forth herein is illustrative and is not intended to limit the scope of the invention as set forth in the following claims. For example, while the invention has been described in an embodiment in which switched circuit 526 is illustrated as being coupled in parallel to a low-side transistor of power stage 508, switched circuit 526 may be coupled to the power supply node in other locations sufficient to absorb energy to reduce the overshoot. In at least one embodiment, switched circuit 526 includes one or more resistors coupled in parallel with a low-side transistor of power stage 508. In other embodiments an internal break diode is used. In at least one embodiment rather than sense $V_{OUT\_L}$ at the load side of inductor L, $V_{OUT\_L}$ is sensed at a node internal to power stage 508. Note that predetermined threshold voltage $V_{TH}$ and predetermined reference value $V_{REF}$ can be selected by the user using conventional techniques. The terms "first," "second," "third," and so forth, as used in the claims, unless otherwise clear by context, are to distinguish between different items in the claims and do not otherwise indicate or imply any order in time, location or quality. For example, "a first access," and "a second access," do not indicate or imply that the first access occurs in time before the second access. Variations and modifications of the embodiments disclosed herein may be made based on the description set forth herein, without departing from the scope of the invention as set forth in the following claims.

What is claimed is:

1. A method for operating a system including a voltage regulating power supply, the method comprising:
   sensing a local voltage on a first node of the system and a remote voltage on a second node of the system, the first node and the second node being in a conductive path between an energy absorbing element and a load of the system, the first node being closer to a power stage of the voltage regulating power supply than the second node, the second node being closer to the load than the first node; and
   detecting a load release event based on the local voltage, the remote voltage, and at least one predetermined threshold value; and
   in response to detection of the load release event, disabling a pulse-width modulated control signal provided to the power stage and enabling a circuit to sink energy from the voltage regulating power supply while the pulse-width modulated control signal is disabled.

2. The method as recited in claim 1 further comprising:
   generating a control signal based on the local voltage, the remote voltage, a slew rate of the remote voltage, and the at least one predetermined threshold value.

3. The method as recited in claim 2 wherein generating the control signal comprises comparing a difference between the local voltage and the remote voltage to a first predetermined threshold value of the at least one predetermined threshold value.

4. The method as recited in claim 3 wherein generating the control signal further comprises comparing the slew rate of the remote voltage to a second predetermined threshold value of the at least one predetermined threshold value.

5. The method as recited in claim 2 wherein the control signal is generated to switch from an active level to an inactive level after a predetermined time.

6. The method as recited in claim 1 wherein the load release event is caused by a processor powered by the voltage regulating power supply.

7. The method as recited in claim 6 wherein the first node and the second node are coupled by routing on a printed circuit board satisfying a mechanical specification for minimum spacing between the processor and the voltage regulating power supply.

8. The method as recited in claim 1 wherein the voltage regulating power supply is a step-down converter.

9. The method as recited in claim 1 wherein detecting the load release event comprises estimating parasitic impedance between the first node and the second node based on the local voltage and the remote voltage.

10. The method as recited in claim 1 further comprising:
after the pulse-width modulated control signal is disabled for a predetermined interval, enabling the pulse-width modulated control signal and disabling the circuit.

11. The method as recited in claim 10 further comprising:
in response to detection of a dynamic voltage change event triggered by the load, disabling the pulse-width modulated control signal while the circuit is disabled.

12. A system comprising:
a power stage of a voltage regulating power supply, the power stage being coupled between an input power supply node and a second power supply node, the power stage being responsive to a pulse-width modulated signal;
an energy absorbing element coupled between an output of the power stage and the second power supply node;
a circuit coupled to the output of the power stage and the second power supply node;
a first node of the system and a second node of the system, the first node and the second node being in a conductive path between the energy absorbing element and a load, the first node being closer to the power stage than the second node, the second node being closer to the load than the first node; and
a processing circuit configured to sense a local voltage on the first node and a remote voltage on the second node and to detect a load release event based on the local voltage and the remote voltage,
wherein the processing circuit is further configured to disable the pulse-width modulated signal and enable the circuit to sink energy from the voltage regulating power supply while the power stage is disabled in response to detection of the load release event based on the local voltage and the remote voltage.

13. The system as recited in claim 12 wherein the processing circuit comprises a pulse width modulator configured to generate the pulse-width modulated signal.

14. The system as recited in claim 12 wherein the processing circuit comprises:
a compensation circuit configured to sense the local voltage and the remote voltage on the second node, compare a difference between the local voltage and the remote voltage to a predetermined threshold level, and compare a slew rate of the remote voltage to a second predetermined threshold level.

15. The system as recited in claim 12 further comprising:
a printed circuit board housing the power stage, the energy absorbing element, the processing circuit, the circuit, and the load.

16. The system as recited in claim 12 wherein the processing circuit is further configured to disable the pulse-width modulated signal in response to detection of a dynamic voltage change event triggered by the load based on the local voltage and the remote voltage, the circuit being disabled while the power stage is disabled.

17. The system as recited in claim 12 wherein the circuit includes a resistance coupled in parallel with a diode or low-side switch of the power stage.

18. The system as recited in claim 12 further comprising:
the load including a processor powered by the voltage regulating power supply, wherein the load release event is caused by a working status change of the processor.

19. The system as recited in claim 12 wherein the processing circuit is further configured to generate an estimate of parasitic impedance between the first node and the second node based on the local voltage and the remote voltage and the processing circuit uses the estimate of parasitic impedance to detect the load release event.

20. A processing system comprising:
a processor coupled to an output voltage node; and
a voltage regulating power supply comprising:
a power stage coupled between an input power supply node and a second power supply node, the power stage being responsive to a pulse-width modulated signal;
an energy absorbing element coupled between an output of the power stage and the second power supply node;
a first node of the processing system and a second node of the processing system, the first node and the second node being in a conductive path between the energy absorbing element and a load, the first node being closer to the power stage than the second node, the second node being closer to the load than the first node; and
a processing circuit configured to sense a local voltage on the first node and a remote voltage on the second node and to detect a load release event of the processor based on the local voltage and the remote voltage,
wherein the processing circuit is further configured to disable the pulse-width modulated signal and enable the energy absorbing element to absorb energy from the voltage regulating power supply while the power stage is disabled in response to detection of the load release event based on the local voltage and the remote voltage.

21. The processing system as recited in claim 20 wherein the processing circuit is further configured to generate an estimate of parasitic impedance between the first node and the second node based on the local voltage and the remote voltage and the processing circuit uses the estimate of parasitic impedance to detect the load release event.

* * * * *

UNITED STATES PATENT AND TRADEMARK OFFICE
CERTIFICATE OF CORRECTION

| | |
|---|---|
| PATENT NO. | : 12,068,687 B2 |
| APPLICATION NO. | : 17/502272 |
| DATED | : August 20, 2024 |
| INVENTOR(S) | : Wei Han and Lili Chen |

It is certified that error appears in the above-identified patent and that said Letters Patent is hereby corrected as shown below:

In the Claims

In Claim 1, Line 10, please delete "and".

Signed and Sealed this
Fifteenth Day of October, 2024

Katherine Kelly Vidal
*Director of the United States Patent and Trademark Office*